US 8,224,575 B2

(12) United States Patent
Faulkner et al.

(10) Patent No.: US 8,224,575 B2
(45) Date of Patent: Jul. 17, 2012

(54) METHOD AND COMPUTER-READABLE STORAGE MEDIUM WITH INSTRUCTIONS FOR PROCESSING DATA IN AN INTERNAL NAVIGATION SYSTEM

(75) Inventors: W. Todd Faulkner, Sylva, NC (US); Stephen R. Chestnut, Arlington, VA (US); David W. A. Taylor, Greensboro, NC (US)

(73) Assignee: ENSCO, Inc., Falls Church, VA (US)

( * ) Notice: Subject to any disclaimer, the term of this patent is extended or adjusted under 35 U.S.C. 154(b) by 1135 days.

(21) Appl. No.: 12/078,911

(22) Filed: Apr. 8, 2008

(65) Prior Publication Data
US 2009/0254276 A1    Oct. 8, 2009

(51) Int. Cl.
*G01C 21/10* (2006.01)
(52) U.S. Cl. ........ 701/501; 701/408; 701/507; 701/508; 701/509; 701/510; 342/357.32; 340/988
(58) Field of Classification Search ............ 701/200, 701/408, 501, 507, 508, 509, 510; 342/36, 342/31, 358, 357.32; 340/988
See application file for complete search history.

(56) References Cited

U.S. PATENT DOCUMENTS

| | | | | |
|---|---|---|---|---|
| 4,232,313 | A | * | 11/1980 | Fleishman ............ 342/36 |
| 5,574,650 | A | | 11/1996 | Diesel |
| 5,724,265 | A | | 3/1998 | Hutchings |
| 5,789,671 | A | | 8/1998 | Fernandez |
| 5,899,963 | A | * | 5/1999 | Hutchings ............ 702/145 |
| 5,956,660 | A | | 9/1999 | Neumann |
| 5,991,334 | A | * | 11/1999 | Papadopoulos et al. ...... 375/216 |
| 6,122,960 | A | | 9/2000 | Hutchings et al. |
| 6,285,954 | B1 | | 9/2001 | Mark et al. |
| 6,292,751 | B1 | | 9/2001 | Frank |
| 6,301,964 | B1 | | 10/2001 | Fyfe et al. |
| 6,305,221 | B1 | | 10/2001 | Hutchings |
| 6,366,855 | B1 | | 4/2002 | Reilly et al. |
| 6,522,266 | B1 | * | 2/2003 | Soehren et al. ............ 340/988 |
| 6,549,845 | B2 | | 4/2003 | Eakle, Jr. et al. |

(Continued)

FOREIGN PATENT DOCUMENTS

JP    2001-264106    9/2001

OTHER PUBLICATIONS

John Elwell, *Inertial Navigation for the Urban Warrior*, part of the SPIE Conference on Digitization of the Battlespace IV, Orlando FL, Apr. 1999.

(Continued)

*Primary Examiner* — Redhwan k Mawari
(74) *Attorney, Agent, or Firm* — Finnegan Henderson Farabow Garrett & Dunner, L.L.P.

(57) ABSTRACT

A method for processing data in an inertial navigation system having a Kalman filter and computer-readable storage medium containing instructions to configure a processor to perform the same. The method produces more accurate estimates of the position, velocity and attitude of the inertial measurement unit. The method is fully automatic and enables zero-velocity updates and fixed-azimuth updates to be performed simultaneously. The method may also include a multi-stage filtering process to filter digital compass data when used in an environment with extraterrestrial magnetic field sources. The method may also include a fixed-lag smoother to improve estimates of the position, velocity and attitude of the inertial measurement unit. The method also may include processes to constrain altitude errors.

20 Claims, 4 Drawing Sheets

U.S. PATENT DOCUMENTS

| | | |
|---|---|---|
| 6,594,617 B2 | 7/2003 | Scherzinger |
| 6,614,352 B2 | 9/2003 | Pellet et al. |
| 6,721,657 B2 | 4/2004 | Ford et al. |
| 6,738,714 B2* | 5/2004 | McCall et al. ............... 701/454 |
| 6,826,477 B2 | 11/2004 | Ladetto et al. |
| 6,912,475 B2 | 6/2005 | Moriya et al. |
| 7,043,364 B2 | 5/2006 | Scherzinger |
| 7,103,471 B2 | 9/2006 | Levi et al. |
| 7,193,559 B2 | 3/2007 | Ford et al. |
| 7,280,916 B2 | 10/2007 | Bang et al. |
| 7,299,034 B2 | 11/2007 | Kates |
| 7,324,906 B2* | 1/2008 | Sato et al. ............... 702/85 |
| 7,421,340 B2* | 9/2008 | Ladetto et al. ............... 701/508 |
| 2003/0018430 A1* | 1/2003 | Ladetto et al. ............... 701/217 |
| 2003/0176970 A1* | 9/2003 | Lin ............... 701/214 |
| 2004/0150557 A1* | 8/2004 | Ford et al. ............... 342/357.14 |
| 2004/0254727 A1* | 12/2004 | Ockerse et al. ............... 701/224 |
| 2005/0022402 A1* | 2/2005 | Ash et al. ............... 33/321 |
| 2005/0033200 A1* | 2/2005 | Soehren et al. ............... 600/595 |
| 2005/0065728 A1 | 3/2005 | Yang et al. |
| 2005/0125141 A1* | 6/2005 | Bye ............... 701/200 |
| 2005/0203701 A1* | 9/2005 | Scherzinger ............... 701/207 |
| 2007/0024496 A1 | 2/2007 | Wright et al. |
| 2007/0150195 A1 | 6/2007 | Koskan et al. |
| 2007/0156337 A1 | 7/2007 | Yanni |
| 2007/0260418 A1 | 11/2007 | Ladetto et al. |
| 2009/0254276 A1* | 10/2009 | Faulkner et al. ............... 701/213 |

OTHER PUBLICATIONS

Dan Simon; Optimal State Estimation, Kalman, H∞ and Nonlinear Approaches; 2006; p. 271-300; Wiley-Interscience; Hoboken, NJ.

Robert M. Rogers; Applied Mathematics in Integrated Navigation Systems; p. 71-94; AIAA Education Series; Reston, VA.

Johann Borenstein; http://www-personal.umich.edu/~johannb/; University of Michigan.

Eric Foxlin—Intersense Inc.; NavShoe Pedestrian Inertial Navigation Technology Brief; Aug. 8, 2006; http://www.ece.wpi.edu/Research/PPL/Workshops/2006/PDF/Intersense.pdf.

P. Groves, G. Pulford, C. Littlefield, D. Nash and C. Mather; Inertial Navigation Versus Pedestrian Dead Reckoning: Optimizing the Integration; Proc ION GNSS 20th International Technical Meeting of the Satellite Division; Sep. 2007; Fort Worth, TX.

Acceleron Technologies; http://www.g-trax.com.

Erik Lithopoulos, Louis Lalumiere, and Ron Beyeler—Applanix Corp.; Aided-inertial for Long-term, Self-contained GPS-denied Navigation and Mapping; http://www.ece.wpi.edu/Research/PPL/Workshops/2007/PDF/Lithopoulos.pdf.

Zupt, LLC; http://www.zupt.com.

Point Research/Honeywell; http://www.pointresearch.com/magnetic/deadreckoning.html.

Mercury Data Systems, http://www.mercdatasys.com/government/.

Quentin Ladetto, http://quentin.ladetto.ch/publications.php.

* cited by examiner

METHOD AND COMPUTER-READABLE STORAGE MEDIUM WITH INSTRUCTIONS FOR PROCESSING DATA IN AN INTERNAL NAVIGATION SYSTEM

GOVERNMENT RIGHTS

This invention was made with Government support under Contract No. W15P7T-05-C-P225 awarded by the Department of Defense. The government may have certain rights in this invention.

BACKGROUND

1. Technical Field

This invention relates to inertial navigation systems using inertial measurement units, where the system provides an estimate of the position of the inertial measurement unit.

2. Description of Related Art

A basic principle in navigation processes is known as "dead reckoning." In dead reckoning, the current position of an object is estimated by measuring the course, speed, and time elapsed since the object was in a known starting position. For example, a person who is orienteering may utilize dead reckoning. By multiplying their average walking speed by the elapsed time, the person can estimate a total distance travelled. Using a map, the person can thus plot their path from a known starting position along a measured compass course. Dead reckoning, however, is only as reliable as the data that is used. In the orienteering example, error may be introduced in the estimates of the course travelled, the average speed, and the elapsed time. As technology developed, inertial navigation systems were developed to address these sources of error to enable more accurate navigation.

Inertial navigation systems perform a sensor-based dead reckoning by using data from an inertial measurement unit (IMU) separately or in combination with a digital magnetic compass (DMC). IMUs typically include three mutually orthogonal linear accelerometers and three mutually orthogonal rate gyroscopes to collect time-series data of linear accelerations and angular rates in the reference frame of the IMU. These six values fully characterize the dynamics of the IMU. DMCs provide three measurements of the strength of the measured magnetic field relative to the same fixed orthogonal axes used to calculate linear acceleration. In the absence of magnetic disturbances, the direction of the measured magnetic field vector gives an estimate of the "magnetic heading."

There are various grades of IMU, which vary by cost, accuracy, size, and weight. The heaviest, most expensive, and most accurate are "navigation-grade" IMUs, which often weigh between five and one hundred pounds. The weight and cost of such IMUs make them impractical for most human-portable applications. At the other end of the spectrum are "industrial-grade" IMUs, which are considerably lighter and less expensive, making them more practical for human-portable applications despite the decreased accuracy. In the middle of the spectrum are "tactical-grade" IMUs.

Typical IMUs and DMCs provide data at roughly 50 to 1000 samples per second. The "operating frequency" of, for example, an IMU is defined as the number of times per second that the six measurements (three linear accelerations and three angular rates) are taken. Each of these time steps is known as "data cycles." During each data cycle, the six measurements, collectively known as an "IMU data packet," are sent to data processing electronics in the inertial navigation system to integrate navigation equations known in the art to produce a current estimate of the velocity. The data processing electronics then integrates again to produce current estimates of the position and the attitude of the IMU.

In a similar manner, the three measurements of magnetic field strength, collectively known as a "DMC data packet" are also taken and sent to the data processing electronics in the inertial navigation system to produce a current estimate of the magnetic heading. The operating frequency of the IMU and the DMC may be the same or different.

Throughout this specification, the term "real-time" is used to refer to the events occurring when the IMU or DMC senses the measured values or when another sensor senses an aiding measurement, as discussed below. Due to processing lag, the data may not be instantly processed by the system. The term "current" is used to refer to events occurring when the data processing electronics or filters have performed operations utilizing the measurements sensed in real-time. Thus, a "current estimate" of the position of an IMU will lag a finite time period behind when the measurements used to calculate the current estimate were actually taken. In this manner, the "current estimate" of the position at the instant when output from the data processing electronics is actually an estimate of a previous position.

The integrations performed by the data processing electronics inherently produce finite errors in the real-time estimates of the position, velocity and attitude, collectively known as "navigation errors." If uncorrected, these errors grow unbounded with time. To help bound the navigation errors, it is common in the art to employ various filtering techniques. One class of filters often used in inertial navigation systems is known as Kalman filters. The term "Kalman filter" will be used to collectively refer to members and variants in this class of filters.

Kalman filters are collectively known as "recursive estimators." This means that Kalman filters use an estimate of a state from an earlier data cycle (i.e. a "current estimate"), in conjunction with real-time measurements, to compute an estimate for the real-time state. In this manner, a Kalman filter works in conjunction with the data processing electronics to estimate the real-time position, velocity, and attitude of an IMU, collectively known as the "navigation estimates." One specific type of Kalman filter is known as an Extended Kalman filter (EKF). This type of Kalman filter is intended for use in nonlinear systems. The EKF also produces estimates of the errors in the real-time state and then, using real-time measurements, constrains those errors.

Although navigation errors are significantly decreased using Kalman filters, other sources of error, such as inaccuracies inherent to an IMU, persist. Because the position estimate is often the most important output of an inertial navigation system, one goal of such a system is to limit the time-induced increase of errors in the position estimate ("position errors"). For simplification, this specification will subdivide position errors into a vertical component and two horizontal components, "along-track" and "cross-track" errors. "Along-track" errors refer to errors in the total distance traveled while "cross-track" errors refer to errors in the direction perpendicular to the direction of travel.

Many techniques have been utilized to help reduce navigation errors in a human-portable inertial navigation system in order to make such systems more accurate for a longer period of use. Such techniques generally add additional data, collectively known as "aiding measurements," to increase the accuracy of the system. One well-known technique for constraining both along-track and cross-track errors is to implement a zero-velocity update (ZUPT) when the IMU is at rest. During a ZUPT, the IMU updates the Kalman filter with a velocity vector showing that the IMU is at zero velocity.

Based on a ZUPT, the system may correct errors in the attitude by using the vertical gravity vector, correct position errors, and estimate correlated IMU errors. Generally, the accuracy of the real-time position estimate from the Kalman filter is directly related to the frequency of the ZUPTs.

ZUPTs are often implemented by placing an IMU on the shoe or boot of a user to utilize the fact that a shoe is normally at zero velocity for a period of time, however brief, during part of a movement, regardless of whether the user is running, walking, or even crawling. This stationary period is exploited to constrain position errors.

One technique used in the prior art to implement a ZUPT was to use a switch placed at the bottom of a walking stick. When the switch was depressed each time the walking stick was planted, the system performed a ZUPT.

In addition to implementing ZUPTs, some systems use global positioning system (GPS) satellites to update the Kalman filter with a known position, thereby constraining position errors. One limitation with the use of GPS, however, is that in many locations, such as underground or in a building away from windows, a user may not be able to receive data from GPS.

Techniques have also been developed to process the data from an inertial navigation system after the user has moved. This technique, known as "post-processing" is often used to give a more accurate representation of where the user was.

Another technique used to constrain position errors is to update the direction of travel, known as the "navigation heading," of the user. This technique, often referred to as a "compass update," is used primarily to constrain the more persistent cross-track errors. In an ideal non-magnetic environment, magnetic heading errors from a series of DMC data packets are essentially uncorrelated and thus ideally suited to correct the navigation heading errors that accumulate over time due to integrated errors in the rate gyroscopes. However, some environments contain strong magnetic field sources that introduce significant errors into DMC measurements. For example, in many indoor environments, DMC data is heavily influenced by magnetic field sources such as structures made of iron or steel, electric generators, or even wiring.

There is a need for a human-portable inertial navigation system that obviates or at least mitigates one or more of the shortcomings of previous techniques to allow more accurate computation of the current or real-time position of a user in a wide range of operating environments for an extended period of time.

SUMMARY

The present disclosure discusses a method for processing data in an inertial navigation system having a Kalman filter to estimate the position of an inertial measurement unit, and a computer-readable storage medium containing instructions to configure a processor to perform such a method.

In one aspect, the method includes receiving data from an inertial measurement unit, determining whether the inertial measurement unit is in a zero-velocity condition, determining whether a predetermined number of data cycles have occurred with a zero-velocity condition present, performing a zero-velocity update to the Kalman filter if the inertial measurement unit is in a zero-velocity condition, performing a fixed-azimuth update to the Kalman filter if a predetermined number of data cycles have occurred with a zero-velocity condition present, and outputting an estimate of the position of the inertial measurement unit.

In another aspect, a computer-readable storage medium contains instructions to configure a processor to perform a method for processing data in an inertial navigation system having a Kalman filter. The method includes receiving data from an inertial measurement unit, determining whether the inertial measurement unit is in a zero-velocity condition, determining whether a predetermined number of data cycles have occurred with a zero-velocity condition present, performing a zero-velocity update to the Kalman filter if the inertial measurement unit is in a zero-velocity condition, performing a fixed-azimuth update to the Kalman filter if a predetermined number of data cycles have occurred with a zero-velocity condition present, and outputting an estimate of the position of the inertial measurement unit.

The accompanying drawings which are incorporated in and constitute a part of this specification, illustrate embodiments of the disclosed method and, together with the description, serve to explain the principles of the method and computer-readable storage medium.

BRIEF DESCRIPTION OF THE DRAWINGS

FIG. 3b is a detail of step 350 of the exemplary method embodied in FIG. 3a.

It is to be understood that both the foregoing general description and the following detailed description are exemplary and explanatory only and are not restrictive of the scope of the invention as claimed.

DESCRIPTION OF THE DISCLOSED EMBODIMENTS

Figure 1:
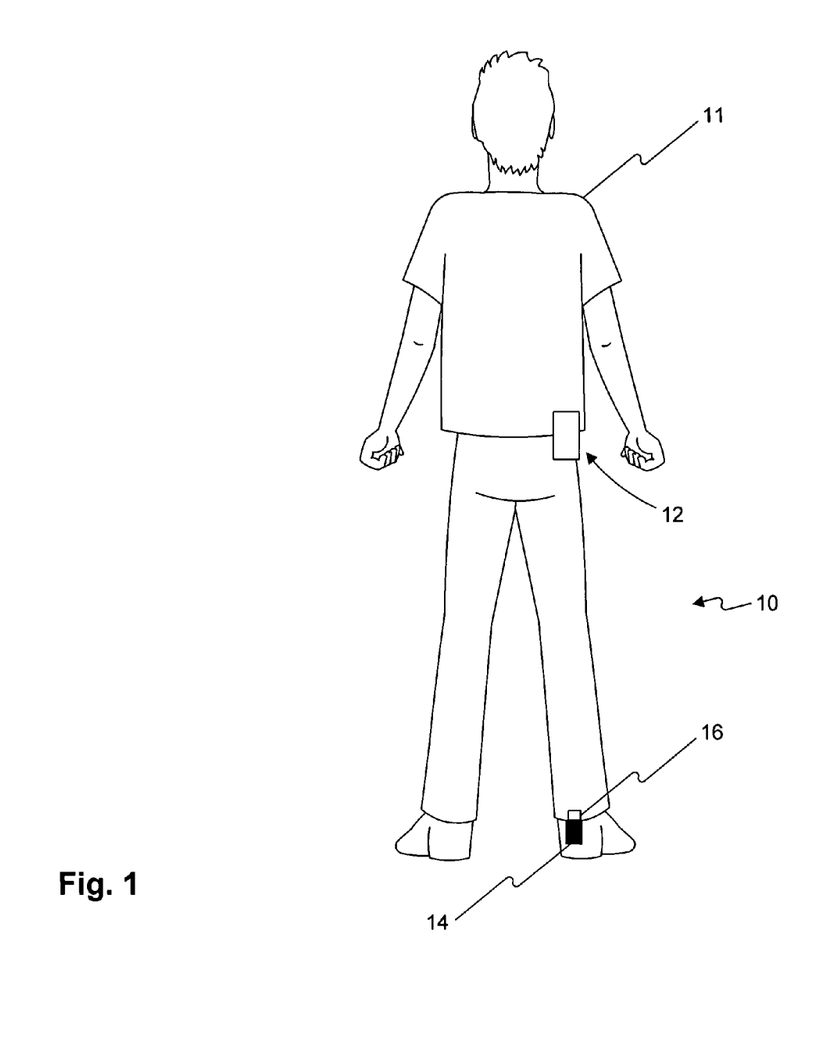
FIG. 1 is an illustration of a user wearing an exemplary system employing the method of the present disclosure.

Referring to FIG. 1, an exemplary inertial navigation system, designated generally by 10, is shown on a user 11. System 10 includes an inertial navigation system control unit 12, an IMU 14, and a DMC 16. IMU 14 and DMC 16 may also be integrated into one enclosure, such as in the nanoIMU (nIMU) commercially available from MEMSense of Rapid City, S.D. When IMU 14 and DMC 16 are integrated, transmission of IMU data packets and DMC data packets are often synchronized.

Control unit 12 may include a digital signal processor 20, discussed below, and a battery pack (not shown). Control unit 12 may be connected to IMU 14 and/or DMC 16 via a wire or wirelessly, as shown in FIG. 1. IMU 14 and DMC 16 are shown attached to the shoe of user 11. While this specific position is not required, IMU 14 and DMC 16 should be mounted such that during various modes of movement (such as walking, crawling, or running), IMU 14 and DMC 16 consistently enter a zero-velocity condition to allow various filtering functions described below to occur. Although system 10 is preferably implemented using an industrial-grade IMU, any grade could be used. The cost, accuracy, and weight of system 10 will be affected by the grade of IMU selected. In FIG. 1, control unit 12 is shown on the waist of the user. Control unit 12 may, however, be located elsewhere or not be used at all. In addition, the functions of digital signal processor 20, as discussed below, need not be performed within the same structure or even on the body of the user.

Figure 2:
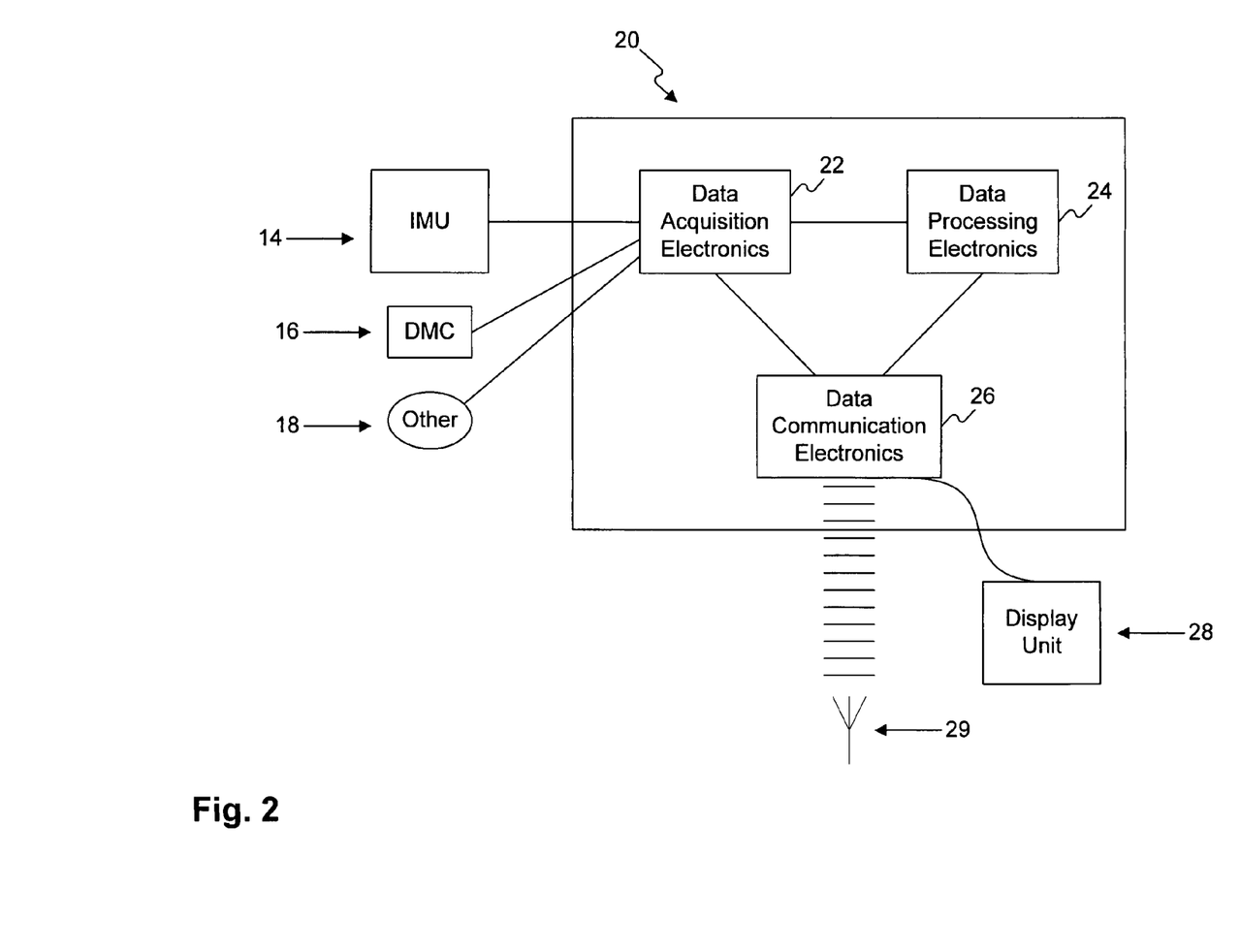
FIG. 2 is a block diagram showing the basic system components of the system embodied in FIG. 1.

Referring now to FIG. 2, an exemplary digital signal processor 20 is shown in greater detail. Digital signal processor 20 includes: data acquisition electronics 22, data processing electronics 24, and data communication electronics 26, all of which are shown interconnected to allow communication with each other. Data acquisition electronics 22 receives, collects, and stores data from IMU 14, DMC 16, as well as other potential sources of data 18, such as, for example, GPS, radio frequency identification, or radio frequency ranging sensors, as will be discussed below.

Data processing electronics 24 may process the data received via data acquisition electronics 22, solve navigation equations, and implement a Kalman filter to estimate the position, velocity, and attitude of IMU 14. After each of these estimates is calculated, it may be stored for a finite period of time in system memory of data processing electronics 24. Raw data may be stored to disk before processing, then stored in memory while awaiting processing. The results of the processing performed in data processing electronics 24 may be stored to disk. When a new "current" estimate is output from data processing electronics 24, all estimates remaining in memory are known as "previous estimates."

Data from data communication electronics 26 may be displayed to the user on display unit 28. Display unit 28 is shown connected to data communication electronics 26 via a wire but the connection may also be wireless. Data communication electronics 26 may also transmit to a data collection receiver 29 via radio frequency or other communications. In addition, data communication electronics 26 may be configured to transmit additional data, such as, for example, biometrics of the user or voice communications through additional input devices (not shown). During operation of system 10, data received by receiver 29 may be used to display the estimated position of IMU 14, for example, on a two-dimensional map or a three-dimensional model of a structure such as a building.

Such a system has many uses, including but not limited to: use by military personnel in an urban environment without access to GPS, use by first responders such as firemen to transmit their position to a command post, use by miners, surveyors, or others wishing to tie a specific position to other data.

Prior to the first integration by data processing electronics 26, initial values for the position, velocity, and attitude must be estimated. The initialization process may be performed during a stationary period, so that the three initial velocity values can be set to zero. This stationary period may be automatically detected, such that a user need not come to a stop solely for the purpose of initializing. The three initial position values may be input by the user or from GPS. The position estimate may be relative to a known fixed starting point or based on an absolute, such as, for example, latitude, longitude, and altitude above sea level.

In addition, the position values during initialization may be received via a radio frequency identification (RFID) tag. To implement such an initialization process, an RFID tag may be embedded into, for example, a mat placed on the ground that remains in a fixed location during system use. A user may stand over the mat for a brief period of time, with the position of the IMU set via the RFID tags to predetermined values. The signal may be received by data communications electronics 26 or data acquisition electronics 24. Such RFID tags may be programmed to only update systems within a certain range, such as, for example, one meter, of the RFID tag.

Initial position values may also be received via radio frequency ranging transponders. Using at least two transponders, triangulation of the range measurements can give an initial position estimate.

Given an initial position estimate, a gravity vector for that position may be computed. Initial attitude estimates (i.e. pitch, roll and navigation heading) may then be estimated algorithmically. A coarse alignment routine may be implemented to obtain approximate values of pitch and roll relative to the gravity vector based on the average sensed linear acceleration measurements during the initialization period. In addition, an initial magnetic heading may be estimated based on the average DMC measurements during the initialization period. After the initialization period, digital signal processor 20 may provide a continuous data processing loop with aiding measurements periodically inserted when appropriate.

In accordance with one aspect of the present disclosure, as embodied and broadly described herein, a method for processing data includes a step of receiving data. In an embodiment shown in FIG. 3a, process 300 includes step 310 wherein data, including data from an IMU, is received.

Figure 3A:
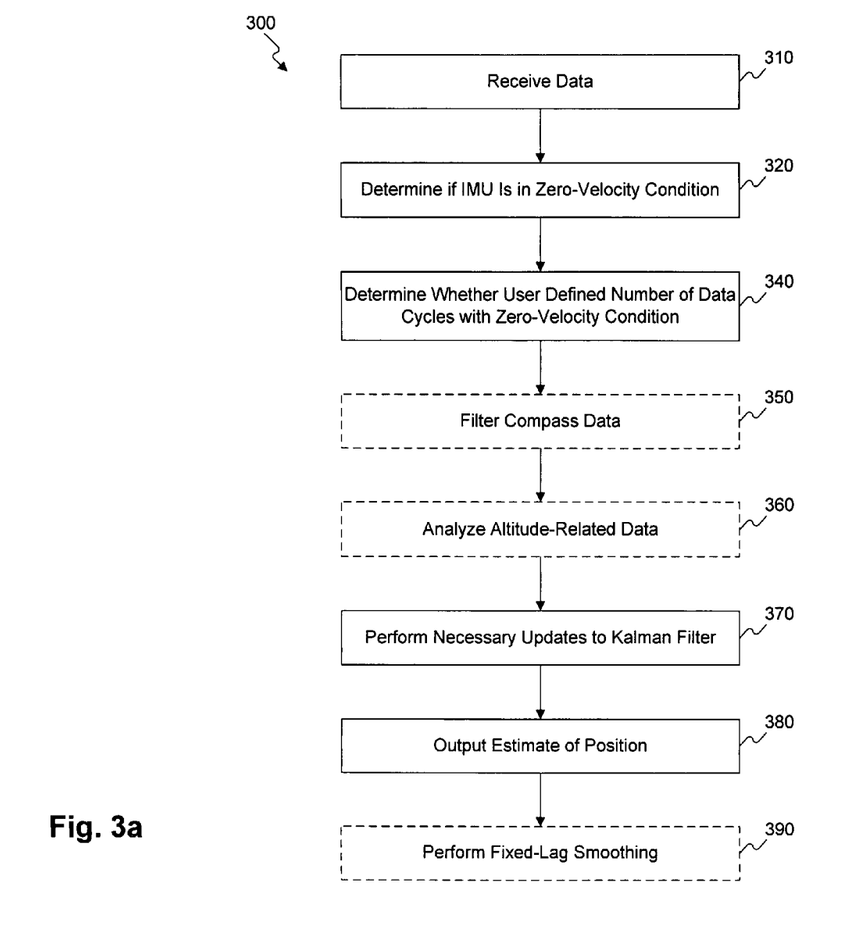
FIG. 3a is an exemplary method of the present disclosure.

Further in accordance with a first aspect of the present disclosure, as embodied and broadly described herein, process 300 includes a step 320 of determining whether the IMU is in a zero-velocity condition. The determination at step 320 is automatic in that it is based on the raw IMU data packet, thereby not requiring additional input from the user. In one embodiment, step 320 may be performed in two or more stages, where all the conditions from each stage must be satisfied before a zero-velocity condition is found. One skilled in the art would appreciate that other implementations could be used, given the present disclosure.

In this two-stage embodiment of step 320, the first stage may include two distinct conditions that must be met. The first condition requires that the difference between the magnitude of the angular rates and the magnitude of earth's rotation be less than a predetermined threshold. The magnitude of the angular rates is determined using the three angular rate values from the received IMU data packet. The difference is then calculated between the magnitude of the angular rates and a known magnitude of the rotation of the earth. The known magnitude of the rotation of the earth is a constant that may be stored in the data processing electronics. This difference is then compared to a predetermined threshold. If the difference is greater than the predetermined threshold, this first condition of the first stage fails and the system cannot find a zero-velocity condition. If the difference is less than the predetermined threshold, the step proceeds to the second condition in the first stage.

The second condition requires that the difference between the magnitude of the linear accelerations and the magnitude of the gravity vector be less than a predetermined threshold. The magnitude of the linear accelerations is determined using the three linear accelerations from the received IMU data packet. The difference is then calculated between the magnitude of the linear accelerations and a known magnitude of the gravity on earth. The known magnitude of the gravity of earth is computed during the initialization. This difference is then compared to a predetermined threshold. If the difference is greater than the predetermined threshold, this second condition of the first stage fails and the system cannot find a zero-velocity condition. If the difference is less than the predetermined threshold, the step proceeds to the second stage.

In this two-stage embodiment of step 320, the second stage may also include two distinct conditions that must be met to find a zero-velocity condition. The first condition requires that the standard deviations in a predetermined window size of consecutive angular rate values along the roll and yaw axes be less than a predetermined threshold. A standard deviation is determined using a predetermined number of recent consecutive angular rate measurements stored in memory with the window centered on the current measurement. Two standard deviations are computed for each window of data along the roll and yaw axes. The standard deviations are then compared to a predetermined threshold. If either difference is greater than the predetermined threshold, this first condition of the second stage fails and the system cannot find a zero-velocity condition. If both differences are less than the predetermined threshold, the step proceeds to the second condition in the second stage.

The second condition in the second stage requires that the standard deviation in a predetermined window size of consecutive linear acceleration measurements be less than a predetermined threshold. A standard deviation is determined using a predetermined number of recent consecutive linear acceleration measurements stored in memory with the window centered on the current measurement. Two standard deviations are computed for each window of data along the pitch and yaw axes. The standard deviations are then compared to a predetermined threshold. If either difference is greater than the predetermined threshold, this second condition of the second stage fails and the system cannot find a zero-velocity condition. If both differences are greater than the predetermined threshold, all four conditions have been met and a zero-velocity condition is present.

In this two-stage embodiment, if any of the four conditions are not met, a zero-velocity condition is not found and a ZUPT cannot occur based on that data cycle. In this embodiment, zero-velocity detection is automatic, as discussed above, and occurs about a tenth of a second behind real-time.

Further in accordance with a first aspect of the present disclosure, as embodied and broadly described herein, if a zero-velocity condition is found in step 320, the method may include a step 340 of determining whether a predetermined number of data cycles have occurred with a zero-velocity condition present, thereby determining that the navigation heading is fixed. A purpose of step 340 is to determine whether to perform a fixed-azimuth update (FRAZ) at step 370. A FRAZ shows the Kalman filter that rate of change of the navigation heading is zero. Unlike a ZUPT, which is generally used to limit along-track error, a FRAZ may be used to limit cross-track error.

In a system using a navigation-grade or tactical-grade IMU, which likely have rate gyroscopes sensitive enough to measure the Earth's rotation, determination in step 320 that a zero-velocity condition is present also may provide a heading error correction. However, in a system using an industrial-grade IMU, a heading error correction may not be available. In such systems, a FRAZ may be used to constrain heading errors. In addition, a FRAZ can be used to help estimate gyroscope biases that can be removed from the raw gyroscope data prior to being solved in the navigation equations by the data processing electronics and hence, reduce heading error growth. Once velocity is well constrained by a ZUPT, heading error may be the largest source of position error. Heading errors induced by gyroscope errors may increase position errors in the cross-track dimension that will grow even when using ZUPT updates.

Further in accordance with a first aspect of the present disclosure, as embodied and broadly described herein, process 300 may include step 370, wherein necessary updates are performed to the Kalman filter as is known in the art. In one embodiment, an Extended Kalman filter is implemented. The navigation equations are preferably based on the ψ-angle error model but may be based on other error models.

If step 320 determined that a zero-velocity condition is present, the Kalman filter is updated with a ZUPT. In addition, if step 340 determined that a predetermined number of data cycles have occurred with a zero-velocity condition present, thereby determining that the navigation heading rate is zero, the Kalman filter is updated with a FRAZ. As discussed above, if a zero-velocity condition is not present, a FRAZ will not occur based on that data cycle, because step 340 will not occur.

Further in accordance with a first aspect of the present disclosure, as embodied and broadly described herein, process 300 may include step 380, wherein the system outputs an estimate of the position of the IMU.

Further in accordance with a first aspect of the present disclosure, if steps 320 and 340 determine that the IMU is in a zero-velocity condition and that a predetermined number of data cycles have occurred with a zero-velocity condition present, respectively, the ZUPT and the FRAZ updates at step 370 may occur substantially simultaneously.

Further in accordance with a first aspect of the present disclosure, process 300 may further include receiving data from a GPS satellite. This data may then be used in step 370 to act as an aiding measurement, as discussed above, to update and thus improve the accuracy of the position estimates. In an embodiment of the claimed process utilizing GPS, a GPS signal would be received from four satellites and the Kalman filter would thereby receive a position update. GPS is limited, however, to instances where the system can receive a signal from enough satellites to determine a position. Deep underground or in a building with thick walls, for example, GPS may not be a practical source of position updates.

Further in accordance with a first aspect of the present disclosure, process 300 may further include receiving data from an RFID tag. This data may then be used in step 370 to act as an aiding measurement, as discussed above, to update and thus improve the accuracy of the position estimates. In an embodiment of the claimed process using RFID tags, such tags may be placed at one or more known locations to provide one or more position updates to the Kalman filter. RFID tags, as discussed above, are configurable to various ranges such that a position update would only occur if the IMU was within a predetermined range. For example, a fireman could drop an RFID tag at every doorway entered in a burning building. Subsequently, users employing a properly configured system would receive a position update when they walk near the tags.

Further in accordance with a first aspect of the present disclosure, process 300 may further include receiving data from a radio frequency ranging transponder. This data may then be used in step 370 to act as an aiding measurement, as discussed above, to update and thus improve the accuracy of the position estimates.

Figure 3B:
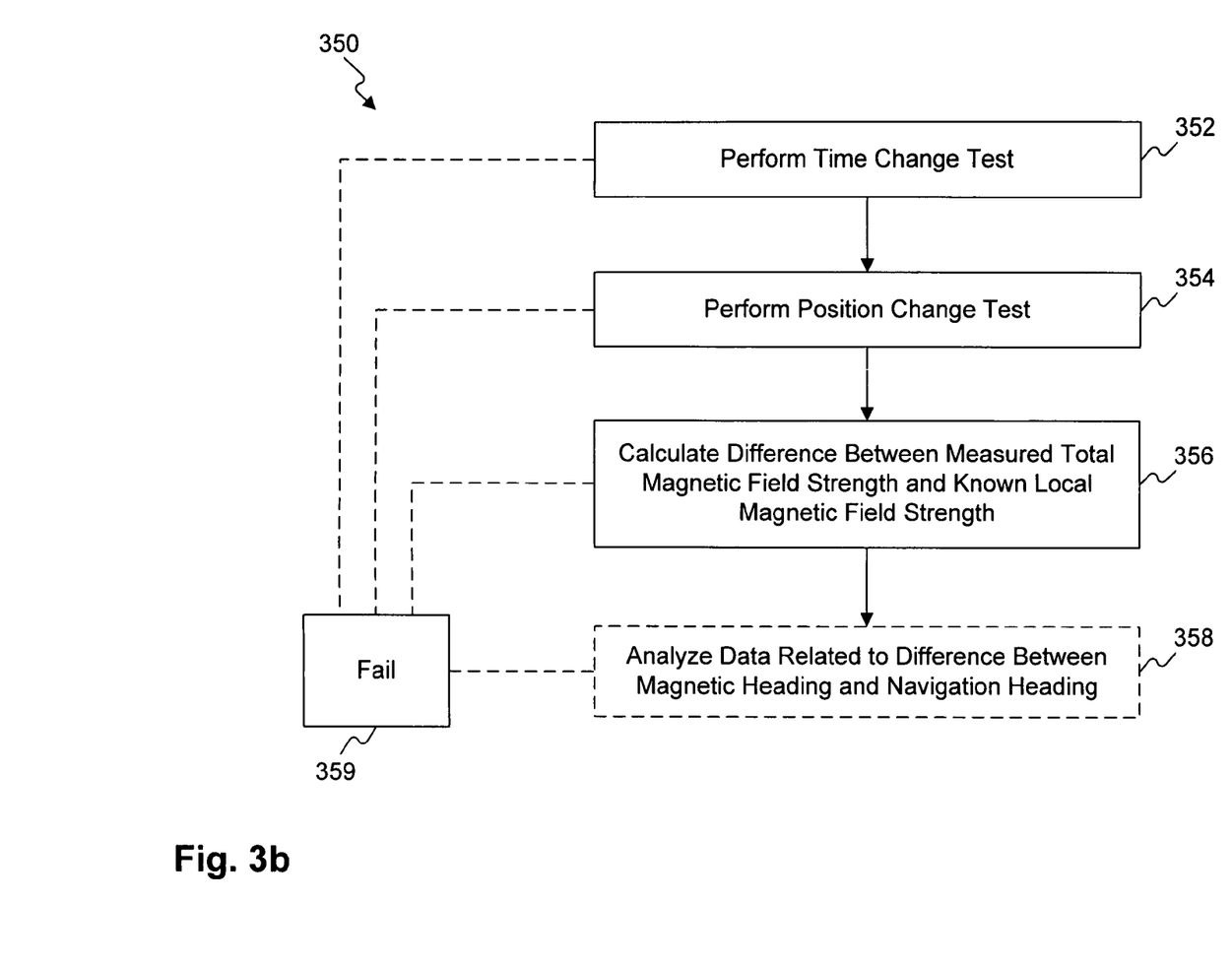

Still further in accordance with a first aspect of the present disclosure, process 300 may further include filtering data received from a DMC. Referring to FIG. 3a, step 350 is shown, wherein data from the DMC is filtered to determine whether to perform a compass update at step 370. As discussed above, in many environments, such as indoors near steel or iron structures, much of the data from a DMC may be noisy and thus unreliable. Filtering as in step 350 enables such DMC data to act as aiding measurements by rejecting data corrupted by magnetic or other disturbances. Such filtering may be especially important if the system utilizes an industrial-grade IMU because, in such systems, as discussed above, ZUPTs may not adequately constrain navigation heading errors. Step 350 thus adds another aiding measurement to further constrain cross-track errors. In an embodiment with step 350, step 310 further includes receiving data from a DMC. Similar to the FRAZ detection in step 340, step 350 is only entered if step 320 determines that a zero-velocity condition is present in the data cycle. If step 350 is not begun, a compass update cannot occur. FIG. 3b expands step 350 into various sub-steps.

In step 352, a time change test is performed by determining whether a predetermined length of time has elapsed since the previous compass update. If no compass update has occurred since initialization, this test is automatically met. This step can be run in real time or on data from previous data cycles. If the predetermined amount of time has not elapsed, the time change test fails at step 359, the DMC data is rejected, and a compass update is not performed during that data cycle. If predetermined amount of time has elapsed, the process advances to step 354.

In step 354, a position change test is performed. During this test, the distance between the current position of the IMU and the position of the IMU when the previous compass update was performed is calculated. This step can be run in real time or on data from previous data cycles. If no compass update has occurred since initialization, this value is zero. If a previous compass update has occurred since initialization, the calculated distance is then compared to a predetermined threshold. If the calculated distance is less than the predetermined threshold, the position change test fails at step 359, the DMC data is rejected, and a compass update is not performed during that data cycle. If the calculated distance is greater than or equal to the predetermined threshold, the process advances to step 356.

In step 356, the process calculates the difference between a measured total magnetic field strength and a known local magnetic field strength. This step can be run in real time or on data from previous data cycles. In one embodiment, steps 352, 354, and 356 are all run in real time. As discussed above, in this embodiment, step 310 further includes receiving a DMC data packet. The magnitude of this measured magnetic field strength is calculated for the data cycle. The difference between the magnitude and a known local magnetic field strength is calculated.

In one embodiment, the known local magnetic field strength is a constant for the general location of use of the system input during the initialization process. In another embodiment, the known local magnetic field may be based on values correlated to GPS coordinates. Such a system may detect its position as discussed above using data from GPS satellites. The system may then transmit such coordinates to access information related to the known local magnetic field strength at the location of use. Such data may then be transmitted back to the system. One skilled in the art would appreciate that other implementations could be used, given the present disclosure.

The calculated difference is compared to a predetermined threshold. If the calculated difference is greater than the predetermined threshold, step 356 fails at step 359, the DMC data is rejected, and a compass update is not performed during that data cycle. If the calculated difference is less than or equal to the predetermined threshold, a compass update is further included in step 370.

Further in accordance with a first aspect of the present disclosure, and referring to FIG. 3b, step 350 may further include step 358, analyzing data related to the difference between the magnetic heading and the navigation heading. In one embodiment, step 358 includes only one stage, consisting of computing the difference between the change in the magnetic heading, $\Delta\phi_-^{DMC}$, and the change in the navigation heading, $\Delta\phi_-^{nav}$, over a predetermined period of time, $t_{current}-t_{previous}$. As discussed above, "current" refers to data from an earlier data cycle that is the most recently processed, while "previous" refers to all other estimates still in system memory. If $|\Delta\phi_{current-previous}^{nav-DMA}|$ exceeds an empirically-defined threshold, step 356 fails at step 359, the DMC data is rejected, and a compass update is not performed during that data cycle. The values above are governed by the following set of equations:

$$\Delta\phi_-^{nav}=\phi_{current}^{nav}-\phi_{previous}^{nav}$$

$$\Delta\phi_-^{DMC}=\phi_{current}^{DMC}-\phi_{pre}^{DMC}$$

$$\Delta\phi_{current-previous}^{nav-DMC}=\Delta\phi_-^{nav}-\Delta\phi_-^{DMC}$$

This stage compares the change in magnetic heading (i.e. the change in the perceived heading relative to magnetic north based on DMC data) to a change in navigation heading (i.e. the change in the heading of the system based on the attitude data from the IMU). Theoretically, those two should be the same because if, for example, someone rotates ninety degrees, their heading relative to magnetic north should also adjust ninety degrees. In the presence of magnetic disturbances, however, the perceived heading to magnetic north could be disrupted. In one embodiment, step 352, 354, 356, and this stage of step 358 may all be run in real time.

In another embodiment, step 358 may also include a second stage, consisting of integrating the inertial navigation equations describing attitude over a predetermined period of time, $t_{next}-t_{current}$, and then computing the difference between the change in the magnetic heading, $\Delta\phi_+^{DMC}$, and the change in the navigation heading, $\Delta\phi_+^{nav}$, over that same period of time. If $|\Delta\phi_{next-current}^{nav-DMC}|$ exceeds an empirically defined threshold, step 356 fails at step 359, the DMC data is rejected, and a compass update is not performed during that data cycle. The values above are governed by the following set of equations:

$$\Delta\phi_+^{nav}=\phi_{next}^{nav}-\phi_{current}^{nav}$$

$$\Delta\phi_+^{DMC}=\phi_{next}^{DMC}-\phi_{current}^{DMC}$$

$$\Delta\phi_{next-current}^{nav-DMC}=\Delta\phi_+^{nav}-\Delta\phi_+^{DMC}$$

"Next" here refers to the time of the real-time attitude measurements being taken at the IMU and DMC. In one embodiment, the system holds approximately 30 seconds of data in system memory. If this stage is used, the other stage of step 358 as well as steps 352, 354, and 356 will be run on current data, rather than real-time data.

Further in accordance with a first aspect of the present disclosure, process 300 may include step 360 to analyze altitude-related data for possible use as an aiding measurement to constrain position errors. Vertical position errors are largely independent of horizontal position errors. Thus, vertical position error can be constrained independently using various altitude constraint algorithms.

In one embodiment of step 360, a "step test" is performed, wherein if the altitude change between two zero-velocity conditions exceeds a predetermined threshold, an altitude update is performed to update the Kalman filter. At the beginning of each footstep, the system computes the change in altitude, dAlt, between two successive footsteps as follows: $dAlt=h-h_{prev}$ where h is the current altitude and $h_{prev}$ is the altitude at the previous footstep. The beginning of a footstep may be defined to be the first zero-velocity condition that is met after a certain period of free navigation. In one embodiment, the time period is a quarter of a second. During initialization, the variable $h_0$ represents an estimate of the initial altitude. During operation, if |dAlt| is less than a predetermined threshold, an altitude update is performed at step 370, setting the altitude observation to the Kalman filter to $h_{prev}$, or alternatively, to $h_0$ if no |dAlt| has exceeded the predetermined threshold since initialization. If |dAlt| is more than a predetermined threshold, then $h_{prev}$ is set to the current altitude h in preparation for the next implementation of the step test.

The purpose of the step test is to help constrain altitude errors. The test is primarily designed when the user is walking on level floors and stairs. In another embodiment, a more general zero-altitude change update may be used, wherein an additional state is added to the Kalman filter and a zero-altitude change update algorithm is implemented. One skilled in the art would appreciate that other implementations could be used, given the present disclosure.

In another embodiment of step 360, a chi-square test is performed, wherein the down component of linear velocity is constrained to lie within a reasonable bound of the earlier values. Generally, chi-square tests are used to test the reasonableness of an observed measurement and often, thereby, to reject outliers.

To perform the test, a one-degree of freedom chi-square statistic, $\chi^2$, for the down component of velocity during a ZUPT is computed as follows:

$$\chi^2 = \frac{v_D^2}{P_{6,6} + R_{ZUPT}}$$

Where, $v_D$ is the down component of velocity, $P_{6,6}$ is the variance estimate for the down component of velocity, and $R_{ZUPT}$ is the observation variance for a ZUPT. $P_{6,6}$ is an output of the Kalman filter and $R_{ZUPT}$ is an empirically-defined constant. After the ZUPT is performed, $\chi^2$ is compared to a predetermined chi-square threshold, $\chi_{vDownThreshold}^2$. If $\chi^2$ is greater than $\chi_{vDownThreshold}^2$, then $v_D$ is constrained as follows:

if $v_D<0, v_D=-\sqrt{\chi_{vDownThreshold}^2(P_{6,6}+R_{ZUPT})}$ if $v_D>0, v_D=\sqrt{\chi_{vDownThreshold}^2(P_{6,6}+R_{ZUPT})}$ If $\chi_{vDownThreshold}^2$ is greater than or equal to $\chi^2$, $v_D$ is not constrained.

In another embodiment of step 360, both the step test and the Chi-Square test are performed. In another embodiment of step 360, data from a barometer may also be used as an aiding measurement to constrain altitude errors. One skilled in the art would appreciate that other implementations could be used, given the present disclosure.

Further in accordance with a first aspect of the present disclosure, process 300 may include performing fixed-lag smoothing at step 380 to improve the position, velocity, and attitude estimates. As discussed above, the Kalman filter provides estimates of navigation errors based, in part, on aiding measurements. The aiding measurements can further improve past estimates of navigation errors. A fixed-lag smoother may be used to compute an optimally smoothed estimate of navigation errors utilizing all available aiding measurements to improve the accuracy of past estimates of navigation error. These improved estimates of navigation errors are used to correct the navigation variables and generate an improved estimate of the operator's position, velocity, and attitude over the fixed time delay window.

When using a fixed-lag smoother, there will often be a lag in the output of the navigation estimates at step 390. In one embodiment, such a lag may increase the time between real-time measurement and output at step 390 from approximately seven seconds without the fixed-lag smoother to approximately thirty seconds with the fixed-lag smoother. One skilled in the art would appreciate that other implementations could be used, given the present disclosure.

In one embodiment, a Rauch-Tung-Streibel (R-T-S) may be used, based on its computational efficiency and applicability to real-time applications. Other forms of fixed-lag smoother may be used. One skilled in the art would appreciate that other implementations for step 390 could be used given the present disclosure.

Further in accordance with a second aspect of the present disclosure, a computer-readable storage medium may contain instructions to configure a processor to perform the previously-described methods.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. Additionally, although aspects of the invention are described as being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing email or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for processing data in an inertial navigation system having a Kalman filter, the method comprising:
    receiving data from an inertial measurement unit;
    determining whether the inertial measurement unit is in a zero-velocity condition based on the received data;
    determining whether a predetermined number of data cycles have occurred with the zero-velocity condition present;
    performing a zero-velocity update to the Kalman filter if the inertial measurement unit is in the zero-velocity condition;
    performing a fixed-azimuth update to the Kalman filter if the predetermined number of data cycles have occurred with the zero-velocity condition present; and outputting an estimate of the position of the inertial measurement unit.

2. The method of claim 1, comprising substantially simultaneously updating the Kalman filter to represent a zero-velocity condition and updating the Kalman filter to represent a heading rate of zero.

3. The method of claim 1, further comprising:
receiving data from a global positioning system satellite; and
performing a position update to the Kalman filter based on the data received from the global positioning system satellite.

4. The method of claim 1, further comprising:
receiving data from a radio frequency identification tag; and
performing a position update to the Kalman filter based on the data received from the radio frequency identification tag.

5. The method of claim 1, further comprising:
receiving data from a radio frequency ranging transponder; and
performing a position update to the Kalman filter based on the data received from the radio frequency ranging transponder.

6. The method of claim 1, further comprising:
receiving data from a compass;
performing a time change test;
performing a position change test;
calculating a difference between a measured total magnetic field strength and a known local magnetic field strength; and
performing a compass update to the Kalman filter based on data received from the compass.

7. The method of claim 1, further comprising:
performing fixed-lag smoothing.

8. The method of claim 6, further comprising:
analyzing data related to a difference between a magnetic heading and a navigation heading.

9. The method of claim 8, wherein the processing of data from the compass are in real-time.

10. The method of claim 8, further comprising:
analyzing data related to the altitude of the inertial measurement unit; and
performing an altitude update to the Kalman filter based on the data related to the altitude of the inertial measurement unit.

11. A non-transitory computer-readable storage medium containing instructions to configure a processor to perform a method for processing data in an inertial navigation system having a Kalman filter, the method comprising:
receiving data from an inertial measurement unit;
determining whether the inertial measurement unit is in a zero-velocity condition based on the received data;
performing a zero-velocity update to the Kalman filter if the inertial measurement unit is in the zero-velocity condition;
determining whether a predetermined number of data cycles have occurred with the zero-velocity condition present;
performing a fixed-azimuth update to the Kalman filter if a user-defined number of data cycles have occurred with the zero-velocity condition present; and
outputting an estimate of the position of the inertial measurement unit.

12. The method of claim 11, comprising substantially simultaneously updating the Kalman filter to represent a zero-velocity condition and updating the Kalman filter to represent a heading rate of zero.

13. The method of claim 11, further comprising:
receiving data from a global positioning system satellite; and
performing a position update to the Kalman filter based on the data received from the global positioning system satellite.

14. The method of claim 11, further comprising:
receiving data from a radio frequency identification tag; and
performing a position update to the Kalman filter based on the data received from the radio frequency identification tag.

15. The method of claim 11, further comprising:
receiving data from a radio frequency ranging transponder; and
performing a position update to the Kalman filter based on the data received from the radio frequency ranging transponder.

16. The method of claim 11, further comprising:
receiving data from a compass;
performing a time change test;
performing a position change test;
calculating a difference between a measured total magnetic field strength and a known local magnetic field strength; and
performing a compass update to the Kalman filter based on data received from the compass.

17. The method of claim 11, further comprising:
performing fixed-lag smoothing.

18. The method of claim 16, further comprising:
analyzing data related to a difference between a magnetic heading and a navigation heading.

19. The method of claim 18, wherein the processing of data from the compass are in real-time.

20. The method of claim 18, further comprising:
analyzing data related to the altitude of the inertial measurement unit; and
performing an altitude update to the Kalman filter based on the data.

* * * * *